March 25, 1924.
G. F. SCHOLLE
1,488,028
AUTOMATIC POULTRY FEED REGULATOR
Filed Sept. 10, 1923
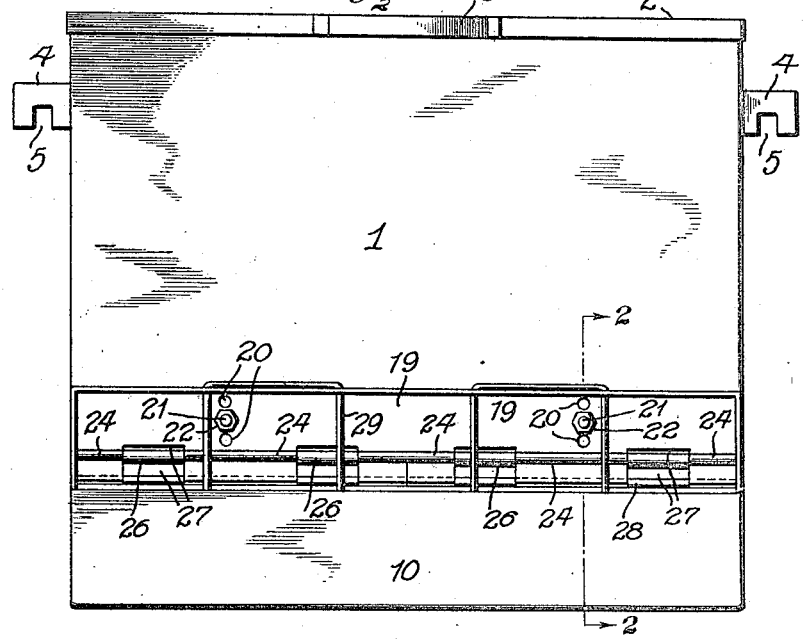
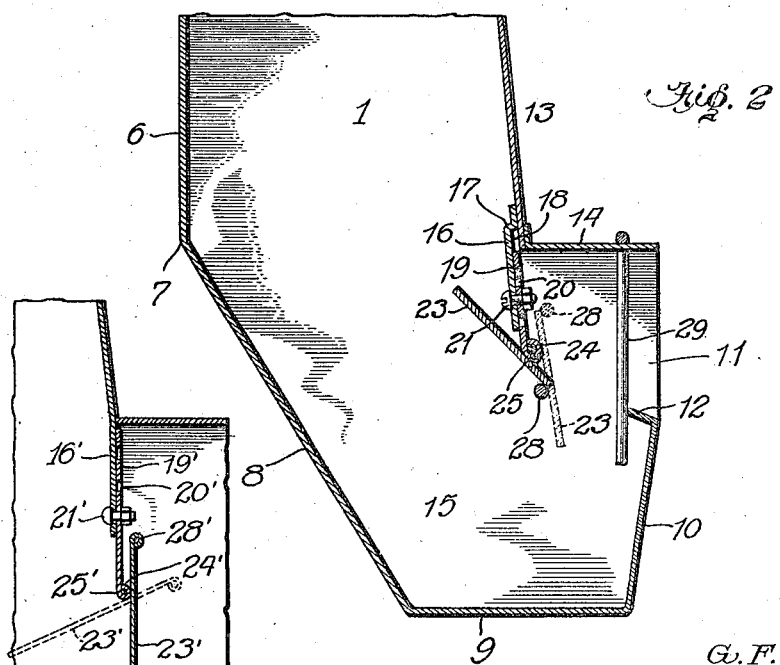
Inventor
G. F. Scholle
By E. M. Bond
Attorney Patented Mar. 25, 1924.

1,488,028

UNITED STATES PATENT OFFICE.

GUSTAV F. SCHOLLE, OF CONCORDIA, MISSOURI.

AUTOMATIC POULTRY-FEED REGULATOR.

Application filed September 10, 1923. Serial No. 661,875.

*To all whom it may concern:*

Be it known that I, GUSTAV F. SCHOLLE, a citizen of the United States, residing at Concordia, in the county of Lafayette and State of Missouri, have invented certain new and useful Improvements in Automatic Poultry-Feed Regulators, of which the following is a specification.

This invention relates to certain new and useful improvements in automatic feed regulators for poultry feeders or the like, and it has for its objects among others to provide a simple and cheap, yet efficient and reliable automatic feed regulator applicable for use in connection with feeders of various types and easily applied to feeders now in use. The present invention embodies a simple construction, quickly and easily applied and adjusted as circumstances may require and by use of which the fowl cannot waste the feed.

It embodies a counterbalanced valve member or gate so constructed and applied that when the feeder is empty or becomes clogged and the feed does not flow down into the feed trough and the trough becomes empty, the fowl reaching in after the feed will cause the feed behind the gate or valve to fall and allow the gate to open. This will allow the fowl to reach in the hopper after feed, and this will cause the feed in the hopper to flow again. As the feed in the hopper falls down it will come against the inner edge of the gate or valve and cause it to close, and prevent the feed trough from becoming too full and obviates overflowing. Provision is made for adjustment of the regulator in accordance with the different kinds of feed. Loosely pendent wires are provided to prevent the poultry from wasting the feed.

Other objects and advantages of the invention will hereinafter appear and the novel features thereof will be particularly pointed out in the appended claims.

The invention, in its preferred form, is clearly illustrated in the accompanying drawing, which, with the numerals of reference marked thereon, form a part of this specification, and in which—

Figure 1 is a front elevation of my improved device.

Figure 2 is a section as on the line 2—2 of Figure 1, looking in the direction of the arrows.

Figure 3 is a sectional detail showing another form of feed regulator supporting means.

Like numerals of reference indicate like parts in the different views.

Referring to the drawings:—

1 designates the hopper which may be of any suitable material and size, in the present instance shown as being provided with a cover 2 and a handle 3, and the hopper is also shown as provided with members 4 extended from opposite sides in the forms of hooks by which the hopper may be supported in any suitable place, the hooks 5 being designed to be detachably engaged over any suitable supports as nails or the like. The cover or lid may be hinged or not, as may be preferred. The handle, the hook, and the lid or cover, and the manner of mounting the latter may be changed at will or sometimes omitted.

The rear wall 6 is substantially perpendicular or vertical, for a greater or less portion from the top edge down to the point 7 where it slants forward forming the inclined wall 8 which extends to the bottom. This provides for the ready flow of the feed and prevents clogging at any point; the feed cannot clog and it will run smoothly. The device is intended primarily for dry mash feed.

The front wall 10 of the feeder extends upwardly from the bottom, forwardly inclined slightly as seen in Figure 2, being provided with the opening 11, the top edge of which is turned inwardly, as seen at 12, to provide an inwardly and upwardly inclined overhang which will tend to prevent waste of the feed by the fowl. The upper front wall 13 is inclined inwardly from the bottom upwardly, as shown, and the horizontal wall 14 is joined thereto in any suitable way, as by soldering. The trough 15 is thus formed in the lower portion of the device.

While the form of hopper or feeder as above described, while very efficient and is that preferred by me, it is to be understood that it is not necessary that the same be of this form for use in connection with the automatic feed regulator to be now described, and no claim is made in this application to the hopper and trough, etc., as the same will be made the subject matter of a separate application.

My improved automatic feed regulator may be made in a variety of ways, two forms being herein shown. That illustrated in Figures 1 and 2 is constructed as follows:—

16 is a plate that extends across the hopper in the upper portion of the trough, being secured thereto in any suitable way, in the present instance being shown as offset at its upper end, as seen at 17, to provide a space 18 for the reception of the upper edge of the gate-carrying member 19, as seen clearly in Figure 2. This gate-carrying member is designed to be vertically adjustable to suit varying conditions; this adjustment may be accomplished in a variety of ways. In the present instance the said member 19 is provided with a plurality of holes 20 for the reception of bolts 21 which are passed through openings in the member 16, as seen in Figure 2, and provided with suitable thumb nuts 22. By this means the regulator is not only detachably secured in position but can be easily adjusted when occasion may require, as for instance, change of the character of the feed. If desired, the substantial equivalent of this mode of adjustment, namely elongated slots, may be employed.

To the lower edge of the member 19 is loosely hinged or pivoted, so as to have free movement, the gate or valve. This may be in one piece, or in sections, as shown in Figure 1. The valve or gate member 23 is pivoted off-centre, as seen in Figure 2. The lower edge of the member 19 is formed at intervals with the ears 24 in which is loosely mounted the rod 25 on which is mounted to freely swing the valve member 23, the latter being formed with ears 26 in longitudinal alinement with the ears 24, as seeen in Figure 1, the adjacent edges of the members 19 and 23 being formed with cut-outs to form openings 27 which allow of free movement of the valve member, the latter being eccentrically mounted, as seen in Figure 2, and provided at its edge with a counterbalance 28 of any suitable nature in the present instance shown as in sections.

When the feed in the hopper is exhausted, or before it is filled, the valve member 23 stands in the position shown by full lines in Figure 2, being thus held by reason of its counterweight. When the feed is placed in the hopper, it throws the valve member down into the position indicated by dotted lines. This bars the entrance of the beak or bill of the fowl so that it cannot get access to the feed except that in the trough. It also prevents the trough from becoming too full of feed. It regulates the amount of feed that flows into the trough.

29 are wires that are loosely supported through openings in the member 14, in the present instance shown as being inverted U-shape, the lower ends engaging the inner edge of the member 12, as seen in Figure 2.

If the fowl must reach far in to get the feed, the loose ends of the depending wires moving inward as the fowl reaches in after the feed, permits it to do so. As the fowl reaches in after the feed it will cause the feed back of the gate or valve 23 to fall; this will cause the valve or gate 23 to open and this will allow the fowl to reach farther in and cause the feed in the hopper to run again, should it have become clogged, which is not likely. As soon as the feed starts to fall, it will come against the inner edge of the gate and cause it to close and prevent the feed trough from overflowing and thus regulate the flow of the feed. The wires 29 prevent the poultry from wasting the feed in a manner well understood.

In figure 3 I have shown another form, which may sometimes be preferred to that shown and above described in connection with Figures 1 and 2. In this form, the front wall of the hopper is downwardly extended, as seen at 16', and the member 19' is provided with a plurality of holes 20' for the reception of the attaching bolt 21'; the lower edge of the member 19' being rolled, as at 24', to receive the rod 25'. The valve 23' is provided at its edge with the counterbalance 28', as shown. The operation is the same as that above described in connection with the form shown in Figures 1 and 2. Vertical adjustment is attained by means of the holes and bolt in accordance with the character of the feed.

Modifications in detail may be resorted to without departing from the spirit of the invention or sacrificing any of its advantages. As above stated, the regulator can be used in connection with hoppers and troughs of forms different from that herein shown.

What is claimed as new is:—

1. An automatic feed regulator for poultry feeders embodying a counterweighted valve mounted to gravitate from an upward to a downwardly extended position.

2. An automatic feed regulator for poultry feeders embodying an eccentrically-mounted valve pivoted for reversal of position by the weight of the feed in the feeder.

3. An automatic feed regulator for poultry feeders embodying an eccentrically-mounted valve and a member on which it is supported, the latter having means for its adjustable attachment, said valve being pivoted for reversal of position by the weight of the feed in the feeder.

4. An automatic feed regulator for the purpose described, the same comprising an attaching plate having a pivot rod at its lower end, a valve eccentrically mounted on said pivot rod, and counter-balancing means at one edge of said valve.

5. A poultry feeder comprising a hopper with a trough, a valve eccentrically mounted for reversal of position by the weight of the feed thereupon for controlling the flow of feed to the hopper-trough, and loosely-suspended means interposed between the mouth to the trough and said valve.

In testimony whereof I affix my signature.

G. F. SCHOLLE.